R. H. NEWMAN.
FRUIT KNIFE.
APPLICATION FILED MAR. 7, 1917.
1,226,797.
Patented May 22, 1917.
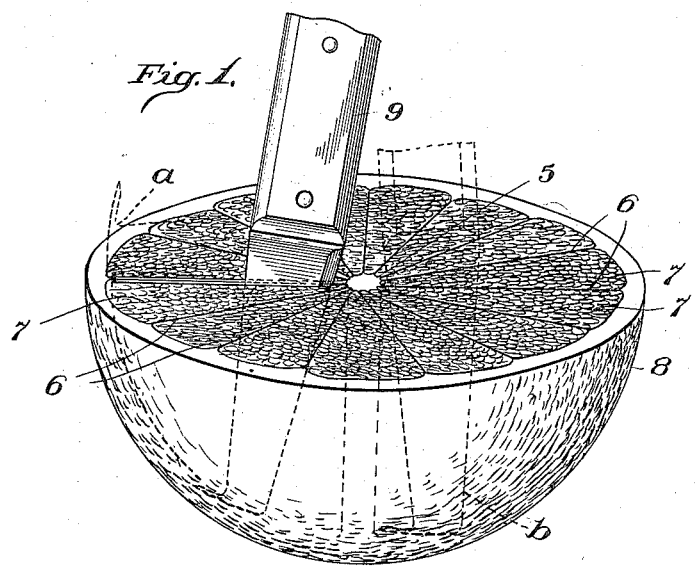
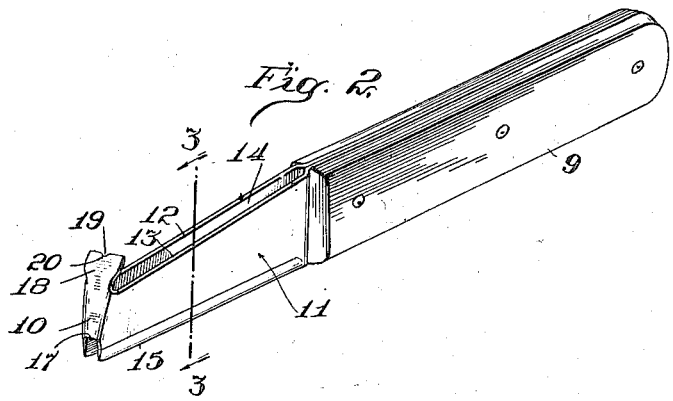
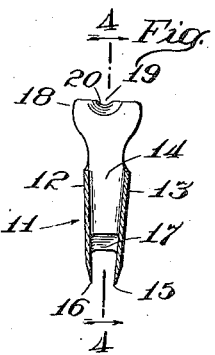
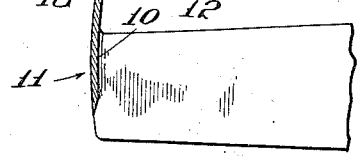
Witnesses
Milton Lenoir
Robert F. Brack
Inventor
Rutledge H. Newman
By Williams, Bradbury & Lee
Attorneys

UNITED STATES PATENT OFFICE.

RUTLEDGE H. NEWMAN, OF CHICAGO, ILLINOIS.

FRUIT-KNIFE.

1,226,797.   Specification of Letters Patent.   Patented May 22, 1917.

Application filed March 7, 1917. Serial No. 152,975.

*To all whom it may concern:*

Be it known that I, RUTLEDGE H. NEWMAN, a citizen of the United States, residing at Chicago, in the county of Cook and State of Illinois, have invented a certain new and useful Improvement in Fruit-Knives, of which the following is a full, clear, concise, and exact description, reference being had to the accompanying drawings, forming a part of this specification.

My invention relates to improvements in fruit knives and has for its object the provision of a knife for quickly and effectively removing the non-edible webs or partitions and central portion or core of grape fruit.

The device of my invention consists generally of two substantially parallel blade members, spaced about 3/32 of an inch apart, slightly more than the thickness of a grape fruit web or partition, together with a third blade connecting the aforesaid blades at their outer ends to form in effect a cutting element having three distinct cutting members.

In separating one of the webs from the fruit cells and the rind of the fruit the knife is placed over the web to be separated and is thrust downwardly into the fruit cells so that the web is separated from the adjacent fruit cells and from the rind in one operation. To enable the blades which are arranged to separate the web or partition from the fruit cells to fulfil their function of cutting the fruit cells from the web it is necessary that the web be held taut, and to hold the web in this condition until it has been severed from the fruit cells I arrange the third blade so that it operates to sever the web from the rind after the parallel blades have accomplished their purpose of severing the fruit cells from the web. A further object of the present invention is the provision of a cutting element for severing the central portion or core from the rind, so that after the webs have been separated as hereinbefore pointed out, the entire non-edible portion of the grape fruit may be removed and the fruit cells to be eaten left in the rind.

These and other features of my invention are pointed out in detail in connection with the accompanying drawings, wherein—

Figure 1 is a perspective view of one half of a grape fruit showing the knife of my invention in operation;

Fig. 2 is a perspective view of the fruit knife;

Fig. 3 is an enlarged vertical cross sectional view taken along the line 3—3 of Fig. 2, looking in the direction indicated by the arrows; and Fig. 4 is a fragmentary cross sectional view taken along the line 4—4 of Fig. 3, looking in the direction indicated by the arrows.

Similar characters of reference refer to similar parts throughout the several views.

In Fig. 1 is shown one-half of a bisected grape fruit having the non-edible center or core 5 and the several webs or partitions 6—6 separating the fruit cells 7—7 and emanating from the center or core 5 to the rind 8. The knife for removing the center and the webs 6—6 is shown in perspective in Fig. 2, and consists of a handle piece 9 attached to the blade in any suitable manner.

In the preferred form of my invention the strap 11 is bent upon itself at 10 to form two substantially parallel blades 12 and 13 having a space 14 between them which is slightly greater than the width of a grape fruit web or partition. The blade 13 is provided with a cutting edge at 15 and the blade 12 with a similar cutting edge at 16. Attention is directed to the fact that the blades 12 and 13 are obliquely disposed relatively to one another, as shown in Fig. 3, so that their upper edges are spaced a greater distance apart than are their lower edges or those which form the cutting edges. The function of this arrangement will be pointed out hereinafter in connection with the operation of the knife.

The bent portion 10 of the knife is provided with a cutting edge 17, the cutting edge being positioned somewhat behind the cutting edges 15 and 16 of the blades 13 and 12 respectively. Extending rearwardly from the portion 10 is a projection 12 provided with a notch 19 the notched portion being sharpened as shown at 20 in Figs. 3 and 4 to provide a cutting edge arranged to separate the core of the grape fruit from the rind.

In the operation of the device the knife is held in the position shown by the dotted lines "a" in Fig. 1, so that the two blades 12 and 13 straddle the web 6 to be separated from the adjacent fruit cells and rind, the cutting edge 17 of the portion 10 being held directly over the outer end of that web and over the inside wall of the rind 8. The outer end of the knife is then forced downwardly around the inside of the rind 8 toward the core 5 whereupon the web or partition which is straddled by the blades 12 and 13 is separated from the rind and is also separated from the fruit cells. On account of the disposition of the cutting edge 17 with respect to the cutting edges of the blades 12 and 13 the web is forced to enter between the blades 12 and 13 before it is severed from the rind. This feature makes it possible to hold the web taut until the cutting edges 15 and 16 have performed their function of separating the adjacent fruit cells from the web.

After one of the webs has been separated from the rind and the fruit the knife is removed and inserted over the next web. This operation is continued until the last web or partition has been separated. To detach the core 5 from the rind the knife is then inserted between two of the separated fruit cells as shown by the dotted lines "b" with the hook or projection 18 extending forwardly. This projection 18 is pushed through the core to separate it from the rind and the knife pulled outwardly with the detached core resting on the hooked portion 18. Since the several webs or partitions 6—6 are separated from the fruit cells and from the rind but not detached from the core the removal of the core will be accompanied by the removal of all of the non-edible webs. The rearwardly flaring disposition of the blades 12 and 13, as shown in Fig. 3, prevents the separated web from adhering to the blades and thus permits the knife to make a clean cut on each side of the partition.

Having thus described my invention, what I claim as new and desire to secure by Letters Patent of the United States, is:

1. A fruit knife consisting of two substantially parallel blades having an intervening space slightly greater than the thickness of a grape fruit partition and connected at their outer ends to form a cutting element for separating the partition from the adjacent fruit cells and from the rind.

2. A fruit knife consisting of two substantially parallel blades having an intervening space slightly greater than the thickness of a grape fruit partition and a third blade at the outer ends of said pair of blades whereby the blades form a cutting element for separating the partition from the adjacent fruit cells and from the rind, the cutting edge of the third blade being disposed behind the cutting edges of the first mentioned blades.

3. A fruit knife consisting of two substantially parallel blades having a space slightly greater than the thickness of a grape fruit partition intervening between the blades for separating the partition from the adjacent fruit cells, and a third blade disposed at the outer ends of the said pair of blades substantially at right angles to the blades and projecting outwardly away from the blades for detaching the core of the fruit from the rind.

4. A fruit knife consisting of two substantially parallel blades having an intervening space slightly greater than the thickness of a grape fruit partition for separating the partition from the adjacent fruit cells, and a third blade at the outer ends of said pair of blades for separating the partition from the rind.

In witness whereof, I hereunto subscribe my name this 3rd day of March, A. D. 1917.

RUTLEDGE H. NEWMAN.

Witnesses:
MARY A. COOK,
ROBERT F. BRACKE.